(12) United States Patent
Terry et al.

(10) Patent No.: US 10,909,034 B2
(45) Date of Patent: Feb. 2, 2021

(54) ISSUE QUEUE SNOOPING FOR ASYNCHRONOUS FLUSH AND RESTORE OF DISTRIBUTED HISTORY BUFFER

(71) Applicant: International Business Machines Corporation, Armonk, NY (US)

(72) Inventors: David R. Terry, Austin, TX (US); Dung Q. Nguyen, Austin, TX (US); Brian W. Thompto, Austin, TX (US); Joshua W. Bowman, Austin, TX (US); Steven J. Battle, Austin, TX (US); Sundeep Chadha, Austin, TX (US); Brian D. Barrick, Pflugerville, TX (US); Albert J. Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 15/845,757

(22) Filed: Dec. 18, 2017

(65) Prior Publication Data
US 2019/0188133 A1    Jun. 20, 2019

(51) Int. Cl.
*G06F 12/0804* (2016.01)

(52) U.S. Cl.
CPC .. *G06F 12/0804* (2013.01); *G06F 2212/1008* (2013.01); *G06F 2212/1016* (2013.01)

(58) Field of Classification Search
CPC ......... G06F 12/0804; G06F 2212/1008; G06F 2212/1016
See application file for complete search history.

(56) References Cited

U.S. PATENT DOCUMENTS

| | | | |
|---|---|---|---|
| 8,161,235 B2 | 4/2012 | Fukuguchi | |
| 8,661,227 B2 | 2/2014 | Abernathy et al. | |
| 8,823,719 B2 | 9/2014 | Yang et al. | |
| 10,379,867 B2* | 8/2019 | Terry | G06F 9/3863 |
| 2015/0220439 A1 | 8/2015 | Mickens et al. | |
| 2016/0253180 A1* | 9/2016 | Genden | G06F 9/3859 |
| | | | 712/240 |
| 2016/0283236 A1 | 9/2016 | Genden et al. | |
| 2016/0328330 A1* | 11/2016 | Ayub | G06F 3/0619 |
| 2016/0371087 A1* | 12/2016 | Le | G06F 9/3802 |
| 2016/0378501 A1* | 12/2016 | Le | G06F 9/30145 |
| | | | 712/206 |
| 2017/0109167 A1* | 4/2017 | Eisen | G06F 9/30072 |

OTHER PUBLICATIONS

Tomari, H., Inaba, M. & Hiraki, K. (2010). Compressing Floating-Point Number Stream for Numerical Applications. First International Conference on Networking and Computing.

* cited by examiner

*Primary Examiner* — Francisco A Grullon
(74) *Attorney, Agent, or Firm* — Patterson + Sheridan, LLP

(57) ABSTRACT

Techniques are disclosed for performing issue queue snooping for an asynchronous flush and restore of a history buffer (HB) in a processing unit. One technique includes identifying an entry of the HB to restore to a register file in the processing unit. A restore ITAG of the HB entry is sent to the register file via a first restore bus, and restore data of the HB entry and the restore ITAG is sent to the register file via a second restore bus. After the restore ITAG and restore data are sent, an instruction is dispatched before the register file obtains the restore data. After it is determined that the restore data is still available via the second restore bus, a snooping operation is performed to obtain the restore data from the second restore bus for the dispatched instruction.

20 Claims, 7 Drawing Sheets

700

ISSUE QUEUE SNOOPING FOR ASYNCHRONOUS FLUSH AND RESTORE OF DISTRIBUTED HISTORY BUFFER

BACKGROUND

The present disclosure generally relates to data processing systems, and more specifically, to techniques for performing a flush and restore of a distributed history buffer in a processing unit.

High performance processors currently used in data processing systems today may be capable of "superscalar" operation and may have "pipelined" elements. Such processors may include multiple execution/processing slices that are able to operate in parallel to process multiple instructions in a single processing cycle. Each execution slice may include a register file and history buffer that includes the youngest and oldest copies, respectively, of architected register data. Each instruction that is fetched may be tagged by a multi-bit instruction tag. Once the instructions are fetched and tagged, the instructions may be executed (e.g., by an execution unit) to generate results, which are also tagged. A Results (or Writeback) Bus, one per execution slice, feeds all slices with the resultant instruction finish data. Thus, any individual history buffer generally includes one write port per Results/Writeback bus.

In traditional processors, the history buffer is typically a centralized component of the processing unit, such that it can back up the data when a new instruction is dispatched and the target register has to be saved into the back up register file. However, such centralized components may not be feasible for processors that include multiple execution/processing slices. For example, in processors with a large number of processing slices, the number of ports needed for such a centralized history buffer can be extensive, leading to an extensive amount of wires between the distributed execution units.

However, including numerous write ports on a history buffer can be expensive to implement in the circuit. For example, as the number of ports associated with the history buffer increases, the circuit area of the history buffer in the processing unit can grow rapidly. This, in turn, creates a compromise on the number of history buffer entries that can be supported in a given circuit area. For example, smaller history buffers generally fill up faster and can impact performance, stalling the dispatch of new instructions until older instructions are retired and free up history buffer entries. On the other hand, larger history buffers are generally expensive to implement and lead to larger circuit size.

To address the limitations associated with centralized history buffers, some processing units may use a distributed history buffer design. In a distributed history buffer design, the history buffer may include multiple distributed levels to provide support for the main line execution of instructions in the processing unit. The use of distributed history buffers, however, has prompted new issues to emerge as areas of concern. One such issue relates to recovery operations for restoring the registers in the register file to the proper states.

SUMMARY

One embodiment presented herein includes a method for performing a flush and restore of a history buffer (HB) in a processing unit. The method generally includes identifying an entry of the HB to restore to a register file in the processing unit, sending a restore ITAG of the HB entry to the register file via a first restore bus, and sending restore data of the HB entry and the restore ITAG to the register file via a second restore bus. The method also includes, after sending the restore ITAG and the restore data, dispatching an instruction prior to the register file obtaining the restore data. The method further includes upon determining that the restore data is still available via the second restore bus, performing a snooping operation to obtain the restore data from the second restore bus for the dispatched instruction.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

DETAILED DESCRIPTION

Figure 1:
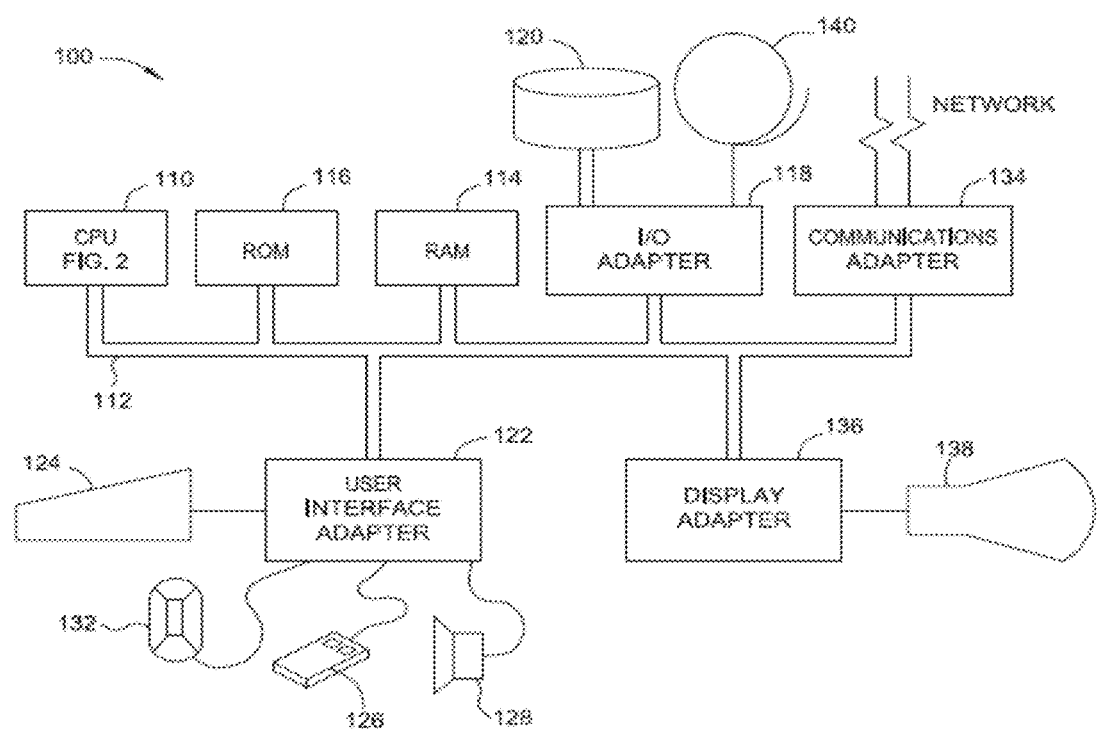
FIG. 1 illustrates an example of a data processing system configured to perform a flush and restore of a distributed history buffer, according to one embodiment.

A processing unit may use a distributed (e.g., multi-level) history buffer (HB) design to overcome the limitations associated with a single level HB. In one reference example, a split-level (two-level) HB may be used in the processing unit. In a split HB design, a smaller first level (L1) HB may include multiple write ports for sinking the multiple write back busses (e.g., one write port per results/write back bus). The L1 HB can move an entry to a larger second level (L2) HB after the valid data for the L1 HB entry has been written back by the write back bus. The write back ITAG compares occur on the fewer number of entries in the L1 HB. The L2 HB may have a greater number of entries than the L1 HB. However, the L2 HB may include a fewer number of write ports (compared to the L1 HB), reducing the circuit size of the L2 HB. In general, however, a processing unit may include a distributed HB with any number of levels (e.g., three levels or more).

In some cases, data that is saved in the HB may have to be restored to the registers (e.g., general purpose registers (GPRs)) in the future. Data may be flushed from the GPRs and need to be restored from the HB for a variety of reasons. One reason is branch mis-prediction, where a processing unit mis-predicts the next instruction to process in branch prediction. Other reasons for a flush include interrupts, load data misses, data errors, etc.

In processing units that use a distributed HB design, the conventional recovery process typically involves marking HB entries (e.g., having data to be recovered) and reading the entries out of the HB. The data is then sent through the issue queue, which issues an instruction (e.g., an error correcting code (ECC) correction instruction) to the execution unit (e.g., fixed/floating point unit, such as a vector scalar unit (VSU)). The execution unit may perform an error recovery process, and place the recovery data on its own result bus (e.g., write back bus). The data can then travel from the result bus to all of the GPR copies to write in the recovery data. Each distributed HB can be recovered simultaneously this way through their respective execution unit. Performing this process, however, for each HB entry in the distributed HB can take a significant amount of time.

In some examples, the amount of time that it takes to perform a flush/restore process can be reduced by enabling the processing unit to perform an asynchronous flush/restore of the distributed HB. In an asynchronous flush/restore, the processing unit can restore an ITAG and data of an HB entry asynchronously in order to speed up dispatch after flush/restore handling. That is, the restore ITAG and restore data can be sent asynchronously on different restore busses. For example, the processing unit may include two restore busses: a "ITAG only" restore bus, and a "ITAG+Write Back (WB) data" restore bus. The "ITAG+WB data" restore bus may be a bus going from the distributed HB to the issue queue to be issued out to the execution unit. The data from the execution unit may be written back into the register file via a write back mechanism. On the other hand, the "ITAG only" restore bus may be a direct bus going from the distributed HB to the register file (e.g., bypassing the issue queue and execution unit), and may be used for restoring HB entries without write back data.

In an asynchronous flush/restore, the restore ITAG is sent out first on the dedicated restore ITAG bus from the distributed HB to write in to the register file as fast as possible. The restore data is sent out second (e.g., after a predetermined number of cycles) on the write back bus. The register file control logic can sync the restore data with the previously sent restore ITAG before writing the ITAG and data into the register file. As soon as the last restore ITAG is visible in the register file logic, the dispatch can resume before the restore data shows up in the register file. This, in turn, can speed up the flush/restore process, relative to traditional flush recovery techniques.

However, in such an asynchronous flush/restore process, the flush recovery may not be finished until the register file has received the last ITAG with (full or partial) restore data. Waiting for the last ITAG with restore data to show up in the register file may slow down the dispatch of instructions, and reduce the speed up/efficiency of the asynchronous flush/restore process.

Embodiments presented herein provide improved techniques for performing an asynchronous flush and restore of a distributed HB in a processing unit, relative to conventional techniques for performing a flush/restore of a HB. More specifically, as described below, embodiments provide techniques for significantly speeding up the flush/restore process for HB entries that do not include write back data (e.g., write back data has not been written to the entries).

Using techniques presented herein, the dispatch can resume when the ITAG of the restoring HB entry (without write back data) is written into the register file, and the issue queue can start snooping the writeback busses for its operand data. For example, the restoring HB ITAG can be written first into the register file to enable early dispatch to look up the dependent ITAG. This same ITAG and its write back data can also be sent through the issue queue (ISQ) and subsequent execution unit to be placed on the write back bus. The dispatch can resume quickly since the ISQ can snoop the writeback bus for operands needed by the new incoming dispatch instructions. For example, assuming an instruction needs operand data that is being restored (e.g., the incoming dispatch instructions need the operands that are being restored from the distributed HB), then the ISQ can snoop the ITAG or the LREG to capture the restore data.

Note, to clearly point out novel features of the present invention, the following discussion omits or only briefly describes conventional features of information processing systems which are apparent to those skilled in the art. It is assumed that those skilled in the art are familiar with the general architecture of processors, and in particular with processors which operate in an in-order dispatch, out-of-order execution, in-order completion fashion. It may be noted that a numbered element is numbered according to the figure in which the element is introduced, and is referred to by that number throughout succeeding figures.

FIG. 1 illustrates an example of a data processing system 100 that may include a HB restoration component for performing a flush/restore of one or more distributed HBs, according to one embodiment. The system has a central processing unit (CPU) 110 such as a PowerPC microprocessor ("PowerPC" is a trademark of IBM Corporation). The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

The CPU (or "processor") 110 includes various registers, buffers, memories, and other units formed by integrated circuitry, and operates according to reduced instruction set computing ("RISC") techniques. The CPU 110 processes according to processor cycles, synchronized, in some aspects, to an internal clock (not shown).

Figure 2:
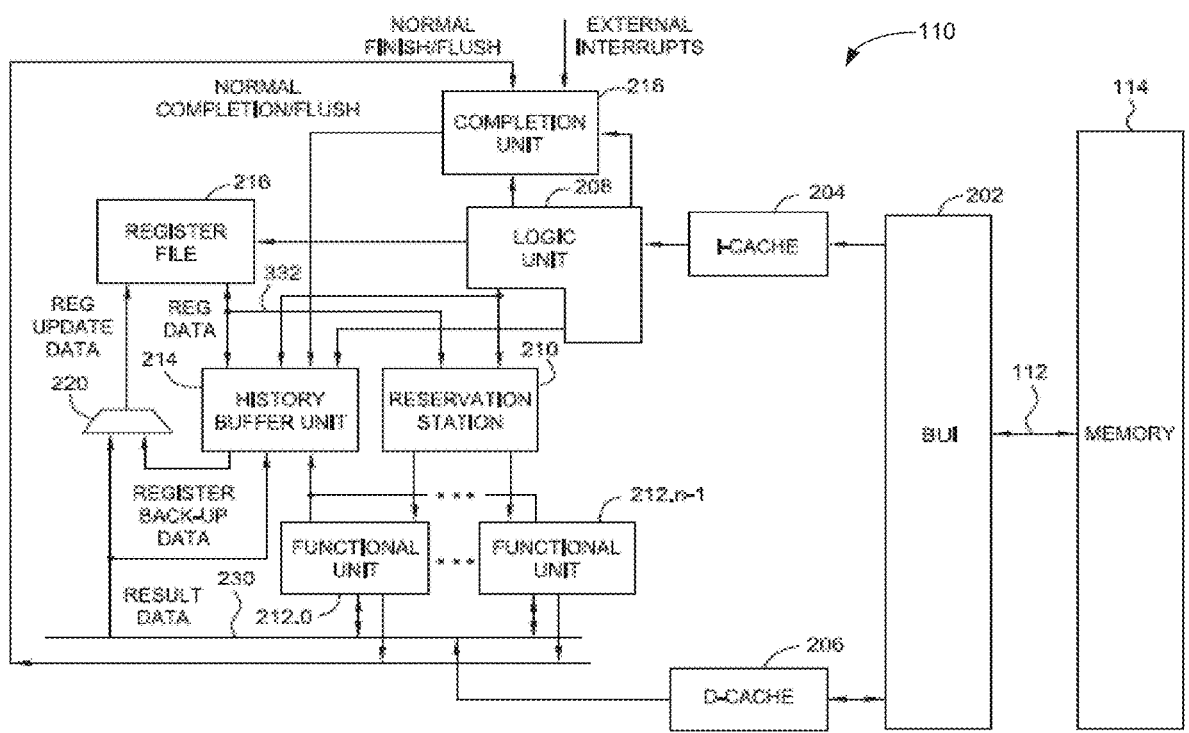
FIG. 2 illustrates a block diagram of a processor that includes one or more history buffer restoration components, according to one embodiment.

FIG. 2 illustrates a block diagram of a processor 110 that may be configured to perform ISQ snooping for an asynchronous flush/restore of a distributed HB, according to one embodiment. Processor 110 may include one or more HB restoration components and one or more distributed HBs. Processor 110 has a bus interface unit 202 coupled to the bus 112 for controlling transfers of data and instructions between memory, such as random access memory 114, and caches, e.g. instruction cache (I-Cache) 204 and data cache (D-Cache) 206.

Instructions may be processed in the processor 110 in a sequence of logical, pipelined stages. However, it should be understood that the functions of these stages, may be merged together, so that this particular division of stages should not be taken as a limitation, unless such a limitation is indicated in the claims herein. Indeed, some of the previously described stages are indicated as a single logic unit 208 in FIG. 2 for the sake of simplicity of understanding and because each distinction between stages is not necessarily central to the present invention.

Logic unit 208 in FIG. 2 includes fetch, branch processing, instruction buffer, decode and dispatch units. The logic unit 208 fetches instructions from instruction cache 204 into the instruction buffer, either based on a normal sequence of the instructions or, in the case of a sequence having a conditional branch instruction, a predicted sequence, the predicted sequence being in accordance with addresses selected by the branch processing unit. The logic unit 208 also decodes the instructions and dispatches them to an appropriate functional unit (e.g., execution unit) 212.0, 212.1, . . . 212.n−1 via reservation station 210. In one embodiment, logic unit 208 may include an instruction sequencing unit (ISU) (not shown) for dispatching the instructions to the appropriate functional units. In executing the instructions, the units 212 input and output information to registers (shown collectively as register file (RF) 216). The functional units 212 signal the completion unit 218 upon execution of instructions and the completion unit 218 retires the instructions, which includes notifying history buffer (HB) unit 214. The HB unit 214 may save a processor state before, for example, an interruptible instruction, so that if an interrupt occurs, HB control logic may recover the processor state to the interrupt point by restoring the content of registers. RF 216 may include an array of processor registers (e.g., GPRs, VSRs, etc.). RF 216 can include a number of RF entries or storage locations, each RF entry storing a 64 bit double word and control bits. In some cases, an RF entry may store 128 bit data. In one embodiment, RF 216 is accessed and indexed by logical register (LREG) identifiers, e.g., r0, r1, . . . , rn. Each RF entry holds the most recent (or youngest) fetched instruction and its ITAG. In some cases, each RF entry may also hold the most recent (or youngest) target result data corresponding to a LREG for providing the result data to a next operation. A new dispatch target replaces (or evicts) a current RF entry. In such cases, the current RF entry can be moved to the HB unit 214. HB logic 214 may use a multi-level or distributed HB in processor 110.

The functional units 212 also assert results on one or more result buses (e.g., write back buses) 230 so that the results may be written by one or more write ports 220 to the registers in the RF 216. In addition to notifying the HB unit 214 about retired instructions, the completion unit 218 or logic unit 208 may also notify the HB unit 214 about exception conditions and mis-predicted branches for which instructions should be discarded prior to completion and for which the HB unit 214 should recover a state of the processor 110 as will be further described below. The HB unit 214 may also receive other information about dispatched instructions from the logic unit 208, the RF 216, and one or more functional units 212.

In some embodiments, a CPU 110 may have multiple execution/processing slices with each slice having one or more of the units shown in FIG. 2. For example, each processing slice may have its own logic unit 208, RF 216, HB unit 214, reservation station 210 and functional/execution units 212. A CPU 110 having the multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Each processing slice may be an independent processor (e.g., processor 110) and may execute instructions independently of other processing slices in the multi-slice processor.

In some embodiments, HB unit 214 may include a HB restoration component (or logic) for performing an asynchronous flush/restore of a distributed HB (e.g., used by the HB unit 214). For example, in each processing slice of CPU 110 there may be two restore buses, an "ITAG only" restore bus and an "ITAG+WB data" restore bus. The HB restoration component may read out a single HB entry to be restored at a time. When a HB entry is read out for restoration, the HB restoration component may send the restore ITAG first on the "ITAG only" restore bus from the distributed HB to write into the register file 216 control logic as fast as possible. For example, the "ITAG only" restore bus may be a dedicated ITAG restore bus to the register file that bypasses the issue queue and the execution unit. The HB restoration component may then send the restore data and ITAG second on the "ITAG+WB data" restore bus. The RF control logic can sync the restore data with the previously sent restore ITAG before writing the ITAG and data into the RF 216.

Figure 3:
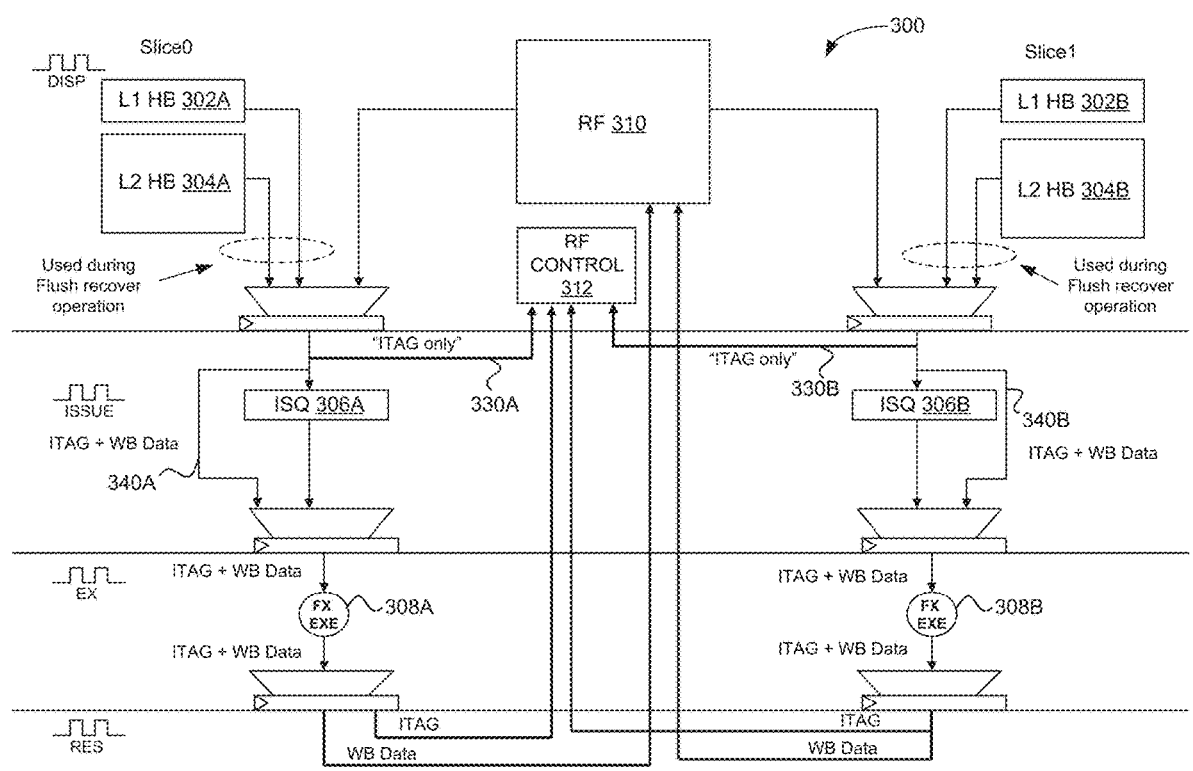
FIG. 3 illustrates a block diagram of a multi-slice processor 300 configured to perform a flush and restore of a distributed history buffer, according to one embodiment.

FIG. 3 illustrates a multi-slice processor 300 configured to perform ISQ snooping for an asynchronous flush/restore of a distributed HB, according to one embodiment. It may be noted that FIG. 3 only shows portions/components of the multi-slice processor 300 that are relevant for this discussion.

In this example, the multi-slice processor 300 includes two processing slices, Slice 0 and Slice 1. Each of the Slices 0 and 1 may include a distributed HB. In this example, each Slice 0 and 1 includes a two level HB: a L1 HB (302a and 302b) and a L2 HB (304a and 304b). Each level of HB may be implemented as a separate circuit in the processor. The L2 HB 304 may include a greater number of entries than the L1 HB 302. For example, in one embodiment, the L1 HB 302 may include 16 HB entries and the L2 HB 304 may include 80 HB entries. Note, however, that the L1 HB 302 and L2 HB 304 may include any number of entries.

Each Slice 0 and 1 also includes an issue queue (ISQ) (306a and 306b), and execution unit(s) (308a and 308b). The execution unit(s) 308 may include a load store unit (LSU), vector scalar unit (VSU), etc. A logic unit (e.g., logic unit 208) may perform instruction fetch and dispatch for the multi-slice processor. As shown, Slices 0 and 1 may share one or more register file(s) 310, which may be configured as a register bank, and register file control logic 312. In some embodiments, Slices 0 and 1 may each include a register file. Slices 0 and 1 may use register file 310, register file control logic 312 and other components therein for register renaming.

The ISQ 306 can hold a set of instructions and the reservation station (not shown in FIG. 3) can accumulate data for the instruction inputs. In some embodiments, the reservation station may be a part of the ISQ 306. Typically, when an instruction is dispatched, the ISQ 306 may allocate an RF entry for the instruction. The source RF entries required as input for the instruction are looked up and passed on to the reservation station. When all source data accumulates for the instruction, the reservation station passes it on to one or more execution units designated for execution of the instruction. Each of the execution units 308 may make result data available on the write back buses (e.g., WB bus 230) for writing into a RF entry or HB entry.

It may be noted that the two slices are shown for ease of illustration and discussion only, and that multi-slice processor 300 may include more than two slices with each slice having all the components discussed above for each of the slices 0 and 1. Further, the processing slices may be grouped into super slices (SS), with each super slice including a pair of processing slices. For example, a multi-slice processor may include two super slices SS0 and SS1, with SS0 including slices 0 and 1, and SS1 including slices 2 and 3. In some cases, one register file 216 may be allocated per super slice and shared by the processing slices of the super slice.

In some embodiments, the slices 0 and 1 of the multi-slice processor 300 may be configured to simultaneously execute independent threads (e.g., one thread per slice) in a simultaneous multi-threading mode (SMT). Thus, multiple threads may be simultaneously executed by the multi-slice processor 300. In some embodiments, a super slice may act as a thread boundary. For example, in a multi thread mode, threads T0 and T1 may execute in SS0 and threads T2 and T3 may execute in SS1. Further, in a single thread (ST) mode, instructions associated with a single thread may be executed simultaneously by the multiple processing slices of at least one super slice, for example, one instruction per slice simultaneously in one processing cycle. The simultaneous processing in the multiple slices may considerably increase processing speed of the multi-slice processor 300.

Typically, when a new instruction (e.g., second instruction) (targeting one of the LREGs in the register file 310) is dispatched, the new instruction may evict the current RF entry associated with the previous instruction (e.g., first instruction), and the current RF entry may be moved to the L1 HB 302. Each entry in the L1 HB 302, therefore, may include an ITAG of the previous instruction, the previous instruction, the evictor ITAG of the new instruction and/or one or more control bits. In some cases, the L1 HB entry may also include result data for the first instruction (e.g., from the write back bus 230). In some embodiments, when valid data has been written back to an entry in the L1 HB 302, the L1 HB entry can be moved to the L2 HB 304.

As shown, each Slice 0 and 1 of the multi-slice processor 300 includes two restore buses: a "direct ITAG only" restore bus 330 (e.g., restore bus 330A in Slice 0 and restore bus 330B in Slice 1); and a "ITAG+WB data" restore bus 340 (e.g., restore bus 340A in Slice 0 and restore bus 340B in slice 1). The "direct ITAG only" bus 330 is a direct restore bus from the distributed HB (e.g., L1 HB 302 and L1 HB 304) to the register file control logic 312. As shown, the "direct ITAG only" bus 330 bypasses the ISQ 306, execution unit(s) 308 and write back bus to register file 310. The "ITAG+WB data" restore bus 340 is a restore bus from the distributed HB to the ISQ 306 to be issued out to the execution unit 308. In some cases, the "ITAG+WB data" restore bus 340 may bypass the ISQ 306. The HB unit 214 (via the HB restoration component) may be configured to perform an asynchronous flush/restore of a distributed HB using the restore busses 330, 340.

In a flush and restore operation, logic unit 208 may determine to restore one or more entries of the register file 310 with entries of the L1 HB 302 and/or L2 HB 304, and signal the HB restoration component to perform a flush and restore operation. The logic unit 208 may send a flush ITAG to the HB restoration component and the HB restoration component may independently perform two different ITAG compares on L1 HB 302 and/or L2 HB 304 based on the flush ITAG. The HB restoration component may perform the flush compare for the distributed HB only (e.g., the HB restoration component may not have to perform flush compares for the GPR/VRF entries in the register file 310). In a first ITAG compare, the flush ITAG, evictor ITAG, and entry ITAG are compared. If the entry ITAG is greater/older than the flush ITAG and the flush ITAG is older than/equal to the evictor ITAG, then the entry may be marked for restoration (e.g., a restore pending (RP) bit may be set to 1 for the entry). In a second ITAG compare, the flush ITAG and entry ITAG are compared. If the flush ITAG is older/equal to the entry ITAG, then the entry can be invalidated. The HB restoration component may generate a vector of HB entries to be restored based on the flush compares with the evictor and entry ITAGs.

Figure 4:
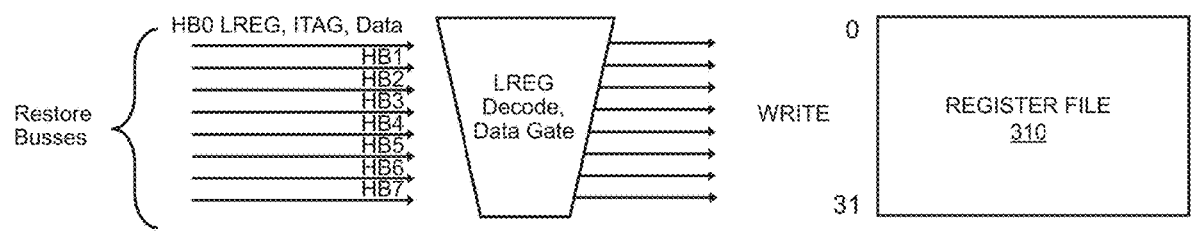
FIG. 4 illustrates an example of a restore function at a register file, according to one embodiment.

FIG. 4 illustrates an example of a restore function at a register file (e.g., register file 310), according to one embodiment. In particular, FIG. 4 depicts a view of the restore function at the register file 310 from the perspective of the processing slices of the multi-slice processor 300. From the perspective of the processing slices, the register file 310 is addressed by LREG(s). For example, the processing slices may decode the LREG(s) from the distributed HB (in the respective processing slices) into a 1-hot write enable vector. As shown, there may be eight LREG vectors, one LREG vector from each processing slice. In some cases, the processing slices may indicate for a given LREG vector that the restore and particular RF are on the same thread. Each LREG vector goes to the GPR register file. Each register file entry may include a writeback bit (W), a history bit (H), and ITAG_valid (ITAG+V) (e.g., from the distributed HB) and data (e.g., from the distributed HB). In one embodiment, setting the writeback bit (W) to "1" may indicate that all writebacks for a thread are finished, and setting the history bit (H) to "1" may indicate that the data was saved previously and may have to be saved at a future time. In some cases, the ITAG associated with the ITAG+V may no longer be valid (e.g., in the case of completed data).

Figure 5:
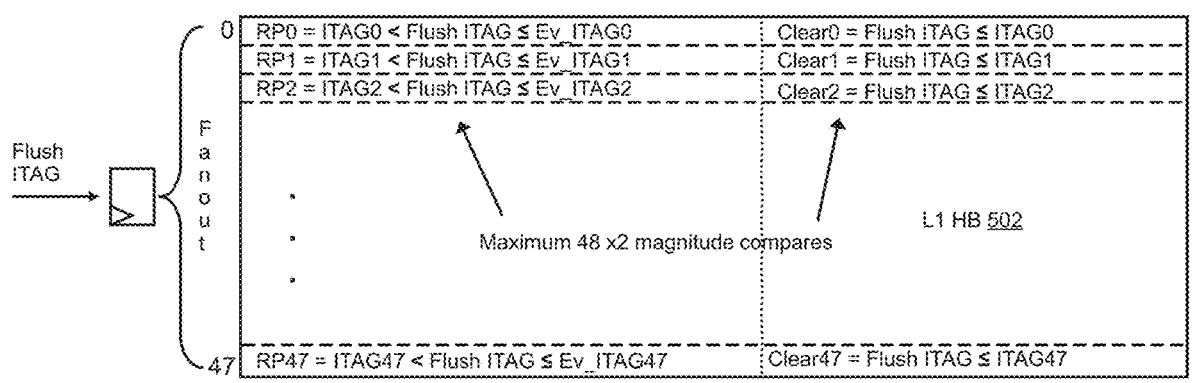
FIG. 5 illustrates an example of a restore operation at a distributed history buffer, according to one embodiment.

FIG. 5 illustrates an example of a restore function performed by the HB restoration component at the distributed HB, according to one embodiment. As noted, the HB restoration component may independently perform two ITAG compares on each level of the distributed HB, e.g., to determine which entries need to be written back to the register file. Note that while FIG. 5 shows the restore function for one level (e.g., L1 HB 502) of the distributed HB, those of ordinary skill in the art will recognize that the HB restoration component may perform the restore function for each level of the distributed HB.

As shown, L1 HB 502 includes 48 HB entries. The restore function may begin with the L1 HB 502 receiving a flush ITAG (e.g., from the logic unit 208). Once the flush ITAG is received, the L1 HB 502 (using the HB restoration component) may perform first magnitude compares of the flush ITAG against the ITAG and evictor ITAG in each occupied HB entry. The L1 HB 502 may set a restore pending (RP) flag (or bit) in every entry where the condition "ITAG<Flush ITAG≤Evictor ITAG" is met.

The L1 HB 502 (via the HB restoration component) may also perform second magnitude compares of the Flush ITAG and ITAG to determine which HB entries of the L1 HB 502 to invalidate/clear. For example, as shown, the L1 HB 502 may clear every entry where the condition "Flush ITAG≤ITAG" is met. In one embodiment, the L1 HB 502 may clear an entry by setting one or more of writeback bit (W), RP, transactional memory bit (TM), ITAG_V, Evictor_ITAG_V to "0".

Figure 6:
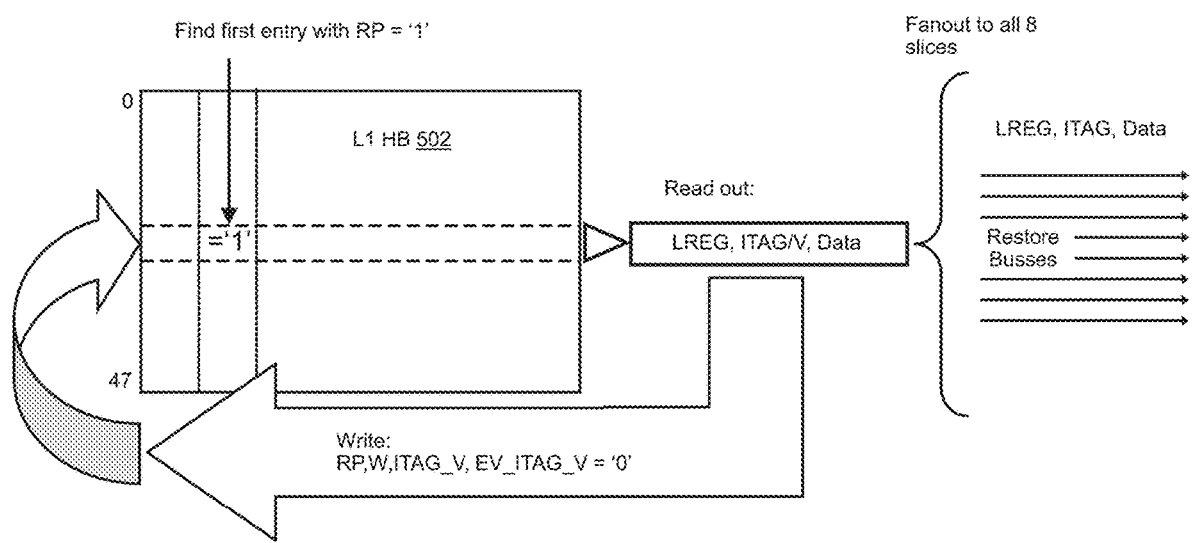
FIG. 6 further illustrates an example of the restore operation at a distributed history buffer, according to one embodiment.

FIG. 6 illustrates an example of a HB restoration component restoring entries from a distributed HB, according to one embodiment. Note that while FIG. 6 shows the restore function for one level (e.g., L1 HB) of the distributed HB, those of ordinary skill in the art will recognize that the HB restoration component may perform the restore function for each level of the distributed HB.

For each cycle of N cycles, where N is the number of entries to restore, the HB restoration component may select one entry (e.g., the first entry) with RP=1, read out the entry, and broadcast the entry to all eight slices of the multi-slice processor 300. As shown in this example, once the HB restoration component selects an entry of the L1 HB 502, the HB restoration component reads out the LREG, ITAG and any available data associated with the entry. The HB restoration component then clears the HB entry. For example, the HB restoration component can clear bits RP, W, ITAG_Valid, Evictor_ITAG Valid, etc. Once the entry is cleared, the HB restoration component repeats the process of selecting the next HB entry, reading the entry, broadcasting the entry to the processing slices, and clearing the entry until there no remaining entries to restore (e.g., there are no entries with RP=1).

As noted above, embodiments presented herein provide techniques for significantly speeding up the flush/restore process for HB entries that do not contain write back data. In particular, embodiments enable dispatch to resume when the ITAG of the restoring HB entry (without write back data) is written into the register file, allow the ISQ to snoop the write back busses for its operand data.

Figure 7:
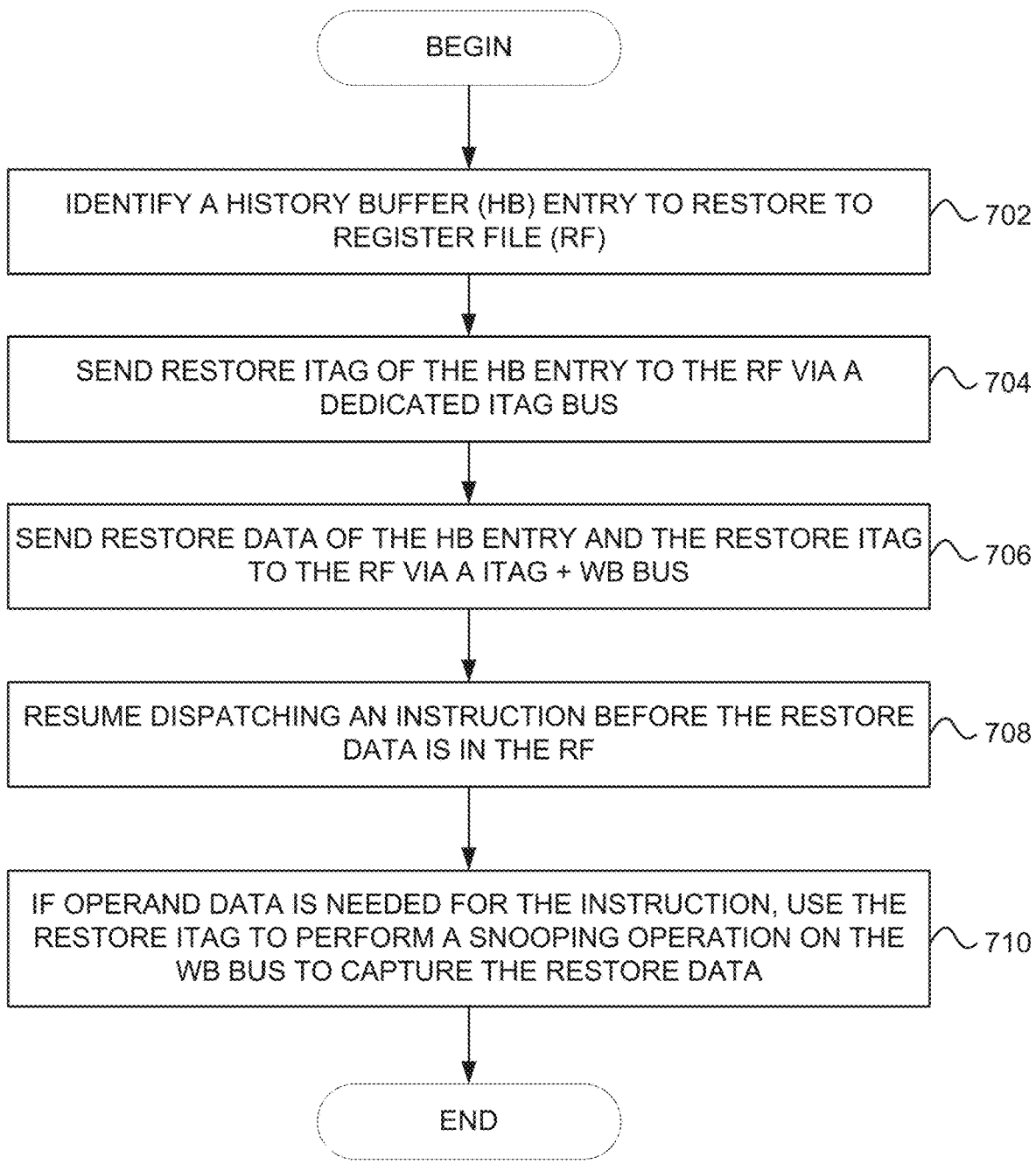
FIG. 7 is a flow chart illustrating a method for performing issue queue snooping for an asynchronous restore of a distributed history buffer, according to one embodiment.

FIG. 7 is a flow chart illustrating a method 700 for performing ISQ snooping for an asynchronous restore of a distributed HB in a processing unit, according to one embodiment. The method 700 can be performed by a processing unit (e.g., CPU 110) or one or more components (e.g., ISQ 306, HB restoration component, etc.) of the processing unit.

As shown, the method 700 begins at block 702, where the processing unit identifies an entry of a HB (e.g., one or more levels of a distributed HB) to restore to a register file. For example, as noted, the processing unit can perform magnitude flush compares of the ITAG for each entry of the HB against a flush ITAG and evictor ITAG, and mark the entries as restore pending if the comparison satisfies a predetermined condition. When the flush compare is completed, the processing unit may have a vector of HB entries to be restored. The processing unit can read out a single HB entry to be restored at a time.

In one embodiment, the processing unit can be configured to send the restore ITAG of the HB entry and the restore data of the HB entry to the register file in an asynchronous manner. For example, the processing unit can write the restoring HB ITAG into the register file first to enable an early dispatch to look up the dependent ITAG. The same ITAG for the HB and its WB data may also be sent through the ISQ and subsequent execution unit to be placed on the WB bus. Thus, as shown at block 704, the processing unit sends the restore ITAG of the HB entry to the register file via a dedicated ITAG bus and, at block 706, the processing unit sends restore data of the HB entry and the ITAG of the HB entry to the register file via a WB bus (e.g., ITAG+WB bus). Block 706 may occur once a predetermined amount of time has elapsed after block 704.

At block 708, the processing unit may resume dispatching instructions before the restore data shows up in the register file. For example, once the processing unit determines that the last restore ITAG is visible in the register file control, the processing unit may resume dispatch. When dispatch resumes, if an instruction needs operand data that is being restored (i.e., if the incoming dispatch instructions need the operands that are being restored from the HB), the processing unit (e.g., via the ISQ) can use the restore ITAG to perform a snooping operation on the WB bus to capture the restore data (block 710).

In one embodiment, the ISQ can snoop the ITAG or the LREG to capture the restore data. For example, if the operand data coming from the WB bus is still in the reservation station, the ISQ can compare the restoring ITAG/LREG with the source ITAG/LREG coming from the register file control. If the ISQ determines there is a match, the ERS can grab the data from the WB bus. Enabling the ISQ to snoop the WB bus for operands needed by new incoming dispatch instructions can enable dispatch to resume even quicker, e.g., compared to waiting for the operand data to show up in the register file.

In some embodiments, if the operand data is already in the register file, then the processing unit can obtain the operand data by reading the register file (e.g., via a normal RF read). In some embodiments, if the operand has not been written into the register file yet, and is no longer in the reservation station WB staging latch (e.g., the data has passed through the latches), then the restore data can be obtained from the RF bypass multiplexer. In this case, the register file control logic can perform a compare between the dispatching source LREG and the source of the restoring LREG. If there is a match, then the register file control logic can bypass the restoring data to the dispatching instruction.

In some embodiments, the ISQ snooping procedure for the asynchronous flush/restore may be based in part on whether data in the HB entry has completed. For example, when an HB entry is read out for restoration, the processing unit can determine whether the data in the HB entry has been completed (e.g., determine whether the instruction that produced the data in that HB entry has completed). The processing unit can determine If the data in the HB entry has completed based on the W bit (e.g., if W=0, then the processing unit may determine that the data was completed).

If the HB data has not completed (e.g., W=1), then the ITAG for that HB entry is still active. The processing unit may therefore send the restore ITAG and restore data asynchronously to the register file via different busses. The processing unit can send the restore ITAG out first from the HB to the register file via the dedicated ITAG bus (e.g., to write into the register file control as fast as possible). After a predetermined amount of time, the processing unit may then send the restore data and ITAG on the WB bus. The register file control may sync the restore data with the previously sent restore ITAG before writing the ITAG and restore data into the register file.

When dispatch resumes, if the processing unit determines that an instruction needs operand data that is being restored, the processing unit may obtain the data for the instruction by at least one of reading the data from the register file, snooping the WB bus, or restoring the data from the RF bypass multiplexer.

On the other hand, if the processing unit determines that the HB data was already completed (e.g., the instruction producing the data in the HB entry was completed), then the ITAG for that particular entry is no longer valid. In this case, the ISQ has to obtain the LREG from the restoring control logic to enable it to snoop the restoring data coming from the WB bus.

To do so, the processing unit (e.g., via the HB restoration component) can insert the producing LREG into the ITAG field of that HB entry. The processing unit may then send the restore ITAG/LREG and restore data asynchronously on different busses. That is, the restore ITAG/LREG can be sent via the dedicated ITAG bus and the restore data and ITAG/LREG can be sent (after a predetermined amount of time) via the WB bus. The register control may sync the restore data with the previously sent restore ITAG/LREG before writing the ITAG and restore data into the register file.

When dispatch resumes, if the processing unit determines that an instruction needs operand data that is being restored, the processing unit can obtain the data via a RF normal read, assuming the operand data is already in the register file. In cases where the ITAG/LREG is available in the RF control, then the ITAG/LREG field for the operand can be read out and sent to the ISQ. In some cases, if the operand data coming from the WB bus is still in the reservation station, the processing unit (via the ISQ) may obtain the data by snooping the WB bus. For example, as noted, the ISQ can compare the restoring ITAG/LREG with the source ITAG/LREG coming from the register file control, and if there is a match, the reservation station can capture the data from the WB bus. In some cases, as described above, if the operand data has not been written into the register file and is no longer in the reservation station WB staging latch, then the data can be obtained from the register file bypass multiplexer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for performing a flush and restore of a history buffer (HB) in a processing unit, the method comprising:
    identifying an entry of the HB to restore to a register file in the processing unit;
    sending a restore ITAG of the HB entry to the register file via a dedicated restore bus from the HB to the register file, wherein the restore ITAG sent to the register file via the dedicated restore bus bypasses an issue queue and execution unit in the processing unit;
    sending restore data of the HB entry and the restore ITAG to the register file via a writeback bus from the execution unit to the register file;
    after sending the restore ITAG and the restore data via the writeback bus, dispatching an instruction prior to the register file obtaining the restore data; and
    upon determining that the restore data is still available via the writeback bus, performing a snooping operation to obtain the restore data from the writeback bus for the dispatched instruction.

2. The method of claim 1, wherein determining that the restore data is still available via the writeback bus comprises determining that the restore data is in a reservation station in the processing unit.

3. The method of claim 2, wherein performing the snooping operation comprises:
    performing a comparison between the restore ITAG sent via the dedicated restore bus and the restore ITAG sent via the writeback bus; and
    obtaining the restore data if there is a match between the restore ITAG sent via the dedicated restore bus and the restore ITAG sent via the writeback bus.

4. The method of claim 1, further comprising:
    upon determining that the restore data is available in the register file, obtaining the restore data for the dispatched instruction from the register file.

5. The method of claim 1, further comprising:
    upon determining that the restore data is not available via the writeback bus, obtaining the restore data from a multiplexer of the register file, wherein determining that the restore data is not available via the writeback bus comprises determining that the restore data has passed a reservation station of the processing unit, but has not been written into the register file.

6. The method of claim 1, wherein the restore data is sent to the register file via the writeback bus once a predetermined amount of time has elapsed after sending the restore ITAG via the dedicated restore bus.

7. The method of claim 1, wherein the HB comprises a multi-level HB comprising at least a first level HB and a second level HB different from the first level HB.

8. A system, comprising:
    at least one processor comprising a register file, a history buffer (HB), an issue queue, and an execution unit; and
    a memory storing a program, which, when executed on the at least one processor, performs an operation for performing a flush and restore of the HB, the operation comprising:
        identifying an entry of the HB to restore to the register file;
        sending a restore ITAG of the HB entry to the register file via a dedicated restore bus from the HB to the register file, wherein the restore ITAG sent to the register file via the dedicated restore bus bypasses the issue queue and the execution unit in the at least one processor;
        sending restore data of the HB entry and the restore ITAG to the register file via a writeback bus from the execution unit to the register file;
        after sending the restore ITAG and the restore data via the writeback bus, dispatching an instruction prior to the register file obtaining the restore data; and upon determining that the restore data is still available via the writeback bus, performing a snooping operation to obtain the restore data from the writeback bus for the dispatched instruction.

9. The system of claim 8, wherein determining that the restore data is still available via the writeback bus comprises determining that the restore data is in a reservation station in the at least one processor.

10. The system of claim 9, wherein performing the snooping operation comprises:
performing a comparison between the restore ITAG sent via the dedicated restore bus and the restore ITAG sent via the writeback bus; and
obtaining the restore data if there is a match between the restore ITAG sent via the dedicated restore bus and the restore ITAG sent via the writeback bus.

11. The system of claim 8, the operation further comprising:
upon determining that the restore data is available in the register file, obtaining the restore data for the dispatched instruction from the register file.

12. The system of claim 8, the operation further comprising:
upon determining that the restore data is not available via the writeback bus, obtaining the restore data from a multiplexer of the register file, wherein determining that the restore data is not available via the writeback bus comprises determining that the restore data has passed a reservation station of the at least one processor, but has not been written into the register file.

13. The system of claim 8, wherein the restore data is sent to the register file via the writeback bus once a predetermined amount of time has elapsed after sending the restore ITAG via the dedicated restore bus.

14. A computer program product, the computer program product comprising a computer-readable storage medium having computer-readable program code embodied therewith, the computer-readable program code executable by one or more computer processors to perform an operation for performing a flush and restore of a history buffer (HB) in a processing unit, the operation comprising:
identifying an entry of the HB to restore to a register file in the processing unit;
sending a restore ITAG of the HB entry to the register file via a dedicated restore bus from the HB to the register file, wherein the restore ITAG sent to the register file via the dedicated restore bus bypasses an issue queue and execution unit in the processing unit;
sending restore data of the HB entry and the restore ITAG to the register file via a writeback bus from the execution unit to the register file;
after sending the restore ITAG and the restore data via the writeback bus, dispatching an instruction prior to the register file obtaining the restore data; and
upon determining that the restore data is still available via the writeback bus, performing a snooping operation to obtain the restore data from the writeback bus for the dispatched instruction.

15. The computer program product of claim 14, wherein determining that the restore data is still available via the writeback bus comprises determining that the restore data is in a reservation station in the processing unit.

16. The computer program product of claim 15, wherein performing the snooping operation comprises:
performing a comparison between the restore ITAG sent via the dedicated restore bus and the restore ITAG sent via the writeback bus; and
obtaining the restore data if there is a match between the restore ITAG sent via the dedicated restore bus and the restore ITAG sent via the writeback bus.

17. The computer program product of claim 14, wherein the restore data is sent to the register file via the writeback bus once a predetermined amount of time has elapsed after sending the restore ITAG via the dedicated restore bus.

18. The computer program product of claim 14, the operation further comprising upon determining that the restore data is available in the register file, obtaining the restore data for the dispatched instruction from the register file.

19. The computer program product of claim 14, the operation further comprising upon determining that the restore data is not available via the writeback bus, obtaining the restore data from a multiplexer of the register file, wherein determining that the restore data is not available via the writeback bus comprises determining that the restore data has passed a reservation station of the processing unit, but has not been written into the register file.

20. The system of claim 8, wherein the HB comprises a multi-level HB comprising at least a first level HB and a second level HB different from the first level HB.

* * * * *